(12) United States Patent
Perkitny et al.

(10) Patent No.: US 6,547,296 B1
(45) Date of Patent: Apr. 15, 2003

(54) DISC HANDLING TOOL

(75) Inventors: Jerzy Perkitny, Lakewood, OH (US); James Groman, Lakewood, OH (US); James M. Elliott, Bay Village, OH (US)

(73) Assignee: Mag-Nif Incorporated, Mentor, OH (US)

( * ) Notice: Subject to any disclaimer, the term of this patent is extended or adjusted under 35 U.S.C. 154(b) by 0 days.

(21) Appl. No.: 10/067,031

(22) Filed: Feb. 4, 2002

Related U.S. Application Data
(60) Provisional application No. 60/336,487, filed on Oct. 22, 2001.

(51) Int. Cl.[7] ................................................. B25J 15/08
(52) U.S. Cl. ........................ 294/16; 294/28; 294/110.1
(58) Field of Search ............................ 294/6, 16, 19.3, 294/27.1, 28, 29, 31.1, 106, 110.1, 115–117; 414/941

(56) References Cited

U.S. PATENT DOCUMENTS

| | | | | |
|---|---|---|---|---|
| 1,592,286 A | * | 7/1926 | Rymarz | ........................ 294/28 |
| 1,688,404 A | * | 10/1928 | Stark | ........................ 294/31.1 |
| 2,570,069 A | * | 10/1951 | Novak | ........................ 294/28 X |
| 2,958,556 A | * | 11/1960 | Samuelson et al. | ........ 294/115 X |
| 3,425,732 A | * | 2/1969 | Reich | ............................ 294/16 |
| 4,595,221 A | | 6/1986 | de Geus et al. | |
| 4,726,615 A | | 2/1988 | Goldberg | |
| 4,997,224 A | | 3/1991 | Pierce | |
| 5,110,167 A | | 5/1992 | Friend | |
| 5,192,106 A | | 3/1993 | Kaufman | |

OTHER PUBLICATIONS

The Wall Street Journal, "Cds Forever—No, Scratch That", Friday, Feb. 2, 2001.

\* cited by examiner

*Primary Examiner*—Dean J. Kramer
(74) *Attorney, Agent, or Firm*—Fay, Sharpe, Fagan, Minnich & McKee, LLP (57) ABSTRACT

A disc handling tool includes a housing and first and second arms which are pivotally mounted to the housing in spaced relation to each other. A first gripper is located adjacent a distal end of the first arm. A second gripper is located adjacent a distal end of the second arm. The first and second grippers fit about a peripheral edge of an associated disc with the grippers being tangential to the peripheral edge of the associated disc. A locking member is provided for locking at least one of the first and second arms in one end position in relation to the housing.

22 Claims, 6 Drawing Sheets

DISC HANDLING TOOL

This application claims the benefit of U.S. Provisional Application No. 60/336,487, filed on Oct. 22, 2001.

BACKGROUND OF THE INVENTION

The present invention relates to a device for handling discs such as compact discs (CDs) and digital versatile discs (DVDs). More particularly, this invention relates to a tool for picking up and moving such discs.

Compact discs, which can be either audio type CDs or CD-ROMs contain digital information on one side of the disc. A new type of disc, known as a digital versatile disc or DVD, may contain digital information on both sides. For optimal performance and a long lifetime for such disc, it is best to avoid handling the disc manually in order to eliminate fingerprints, smudging, potential scratching or other types of damage. Discs are usually stored in a so called jewel box or a similar storage container. Handling is necessary in order to transfer the disc from its box to a player, either an audio compact disc player, such as a single player or a carousel, a CD-ROM drive of a computer or a DVD player which can be a computer's DVD drive or a DVD player connected to a television set. Handling is also necessary to transfer the discs back into their storage containers. Furthermore, handling of such discs is necessary when the disc is being cleaned.

Various tools have been developed for handling disc-like objects which cannot or should not be touched on their two sides by a person's fingers. Among these are record handling devices. Several types of compact disc handling devices are also known. One known device has a central post used to disengage a compact disc from the resilient fingers which hold it in place in a jewel box as well as two flexible arms which can grasp spaced areas on a rim of the disc. Two spring loaded plungers are provided. The first plunger is pressed down to actuate a plug and the engaging arms. The second plunger is pressed to release the grip of the arms on the rim of the disc. However, this device is unwieldy, complicated and has many moving parts.

Also known is a tong-like device for handling opposed edges of a compact disc. The edges can be either the outer edges of the CD or the edges of the central aperture of the disc. However, this device is disadvantageous from the standpoint that it does not allow the gripping of the aperture edges of the compact disc when the disc is in a jewel box. Nor can it simultaneously depress the resilient arms in the jewel box.

Another known disc transfer device has a U-shaped handle, adapted for fitting over a disc storage spindle, and two grippers. One gripper is fixedly attached to one end of the handle while the other gripper is attached to a pivotable arm fixed to the other end of the handle. A lever attached to the moveable arm allows for moving the arm outwards to enable a disc to fit between the grippers. A spring biases the arm into the normally closed position. However, this device is unwieldy since it is so large.

Accordingly, it has been considered desirable to develop a new and improved disc handling device which would overcome the foregoing difficulties and others while providing better and more advantageous overall results.

BRIEF SUMMARY OF THE INVENTION

In accordance with one aspect of the present invention, a disc handling tool is provided.

More particularly, the disc handling tool comprises a housing, a first arm pivotally mounted in the housing and a second arm pivotally mounted in the housing in spaced relation to the first arm. A first gripper is located at a distal end of the first arm for fitting about a peripheral edge of an associated disc. A second gripper is located at a distal end of the second arm for fitting about the peripheral edge of the associated disc. The first and second grippers are tangential to the peripheral edge of the associated disc. A locking member locks at least one of the first and second arms in one end position in relation to the housing.

In accordance with another aspect of the present invention, a tool is provided for handling discs such as CDs, DVDs and the like.

More particularly in accordance with this aspect of the invention, the tool comprises a housing, a first arm pivotally mounted in the housing and a second arm pivotally mounted in the housing in spaced relation to the first arm. A first finger is located at a distal end of the first arm for fitting about a peripheral edge of the associated disc. A second finger is located at a distal end of the second arm for fitting about the peripheral edge of the associated disc. The first and second fingers are tangential to the peripheral edge of the associated disc. A linkage assembly is provided for moving the first and second arms from one end position, in which a distance between the fingers is greater than a diameter of the associated disc, and another end position, in which the distance between the fingers is less than the diameter of the associated disc.

In accordance with still another aspect of the present invention, a tool is provided for handling discs such as CDs, DVDs and the like.

More particularly, in accordance with this aspect of the invention, the tool comprises a housing, a first arm pivotally mounted in the housing and a second arm pivotally mounted in the housing in spaced relation to the first arm. A first gripper is located at a distal end of the first arm for fitting about a peripheral edge of an associated disc. A second gripper is located at a distal end of the second arm for fitting about the peripheral edge of the associated disc. The first and second grippers are tangential to the peripheral edge of the associated disc. A first link member has a first end and a second end, the first link member being positioned in the housing. A second link member has a first end and a second end with the second link member being positioned in the housing in spaced relation to the first link member. An actuator moves the first and second arms in relation to the housing. The first link member is connected, adjacent its first end, to the first arm and, adjacent its second end, to the actuator. The second link member is connected, adjacent its first end, to the second arm and, adjacent its second end, to the actuator.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

Figure 8:
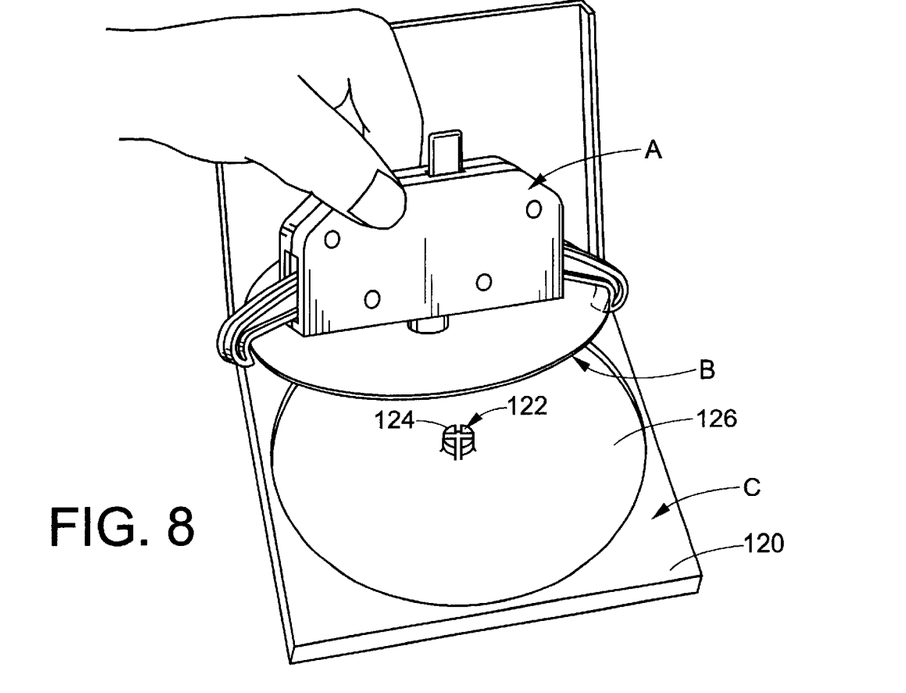
FIG. 8 is a perspective view of the tool being used to remove a disc from its storage case.

Referring now to the drawings wherein the showings are for purposes of illustrating preferred embodiments of the invention only and not for purposes of limiting same, FIG. 8 shows a compact disc tool A for picking up a compact disc B from a jewel case C in which such discs are usually held. As mentioned, the disc can be an audio compact disc or CD, a computer CD-ROM or a DVD.

Figure 1:
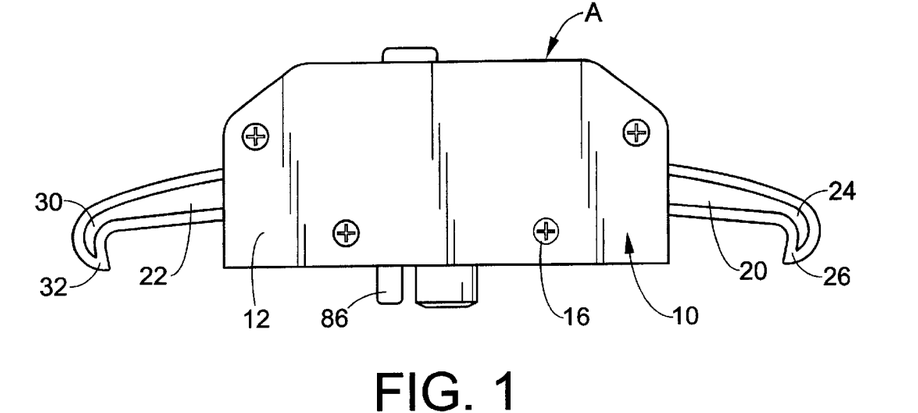
FIG. 1 is a front elevational view of a disc handling tool according to a first preferred embodiment of the present invention.
Figure 2:
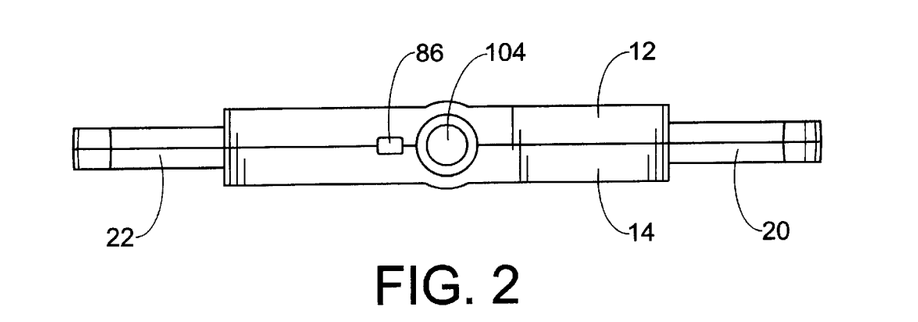
FIG. 2 is a bottom plan view of the tool of FIG. 1.

With reference now to FIG. 1, the disc tool A has a housing 10 with a first half 12 and a second half 14 (FIG. 2) which are secured together by suitable fasteners 16. Extending out of a first side of the housing is a first arm 20 and extending out of a second side of the housing is a second arm 22. Positioned at or adjacent a distal end 24 of the first arm 20 is a first gripping finger or gripper 26. Positioned at or adjacent a distal end 30 of the second arm 22 is a second gripping finger or gripper 32.

Figure 3:
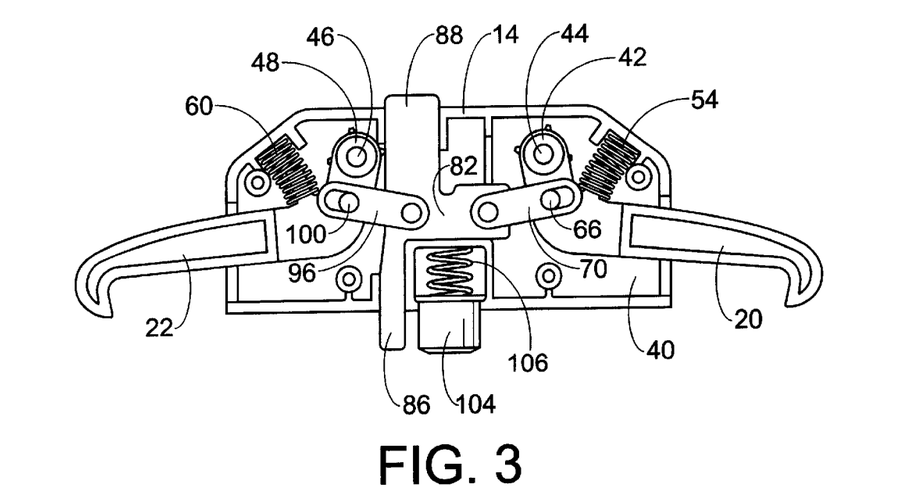
FIG. 3 is a front elevational view of the tool of FIG. 1 with a housing half removed for clarity and showing a first orientation of a pair of arms.

With reference now to FIG. 3, a cavity 40 is defined between the first and second housing halves 12 and 14. Located in the cavity is a first pivot pin 42 on which a proximal end 44 of the first arm 20 is rotatably mounted. Spaced from the first pivot pin 42 is a second pivot pin 46 on which a proximal end 48 of the second arm 22 is rotatably mounted.

Figure 4:
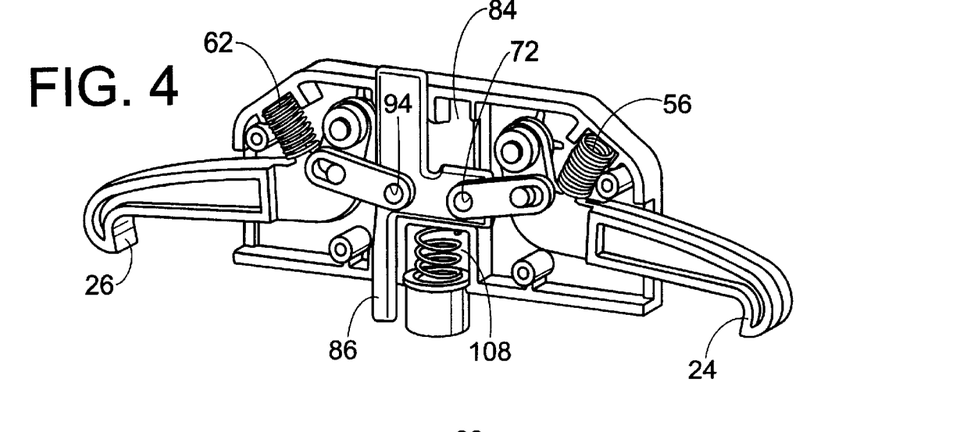
FIG. 4 is a perspective view of the tool of FIG. 3.
Figure 7:
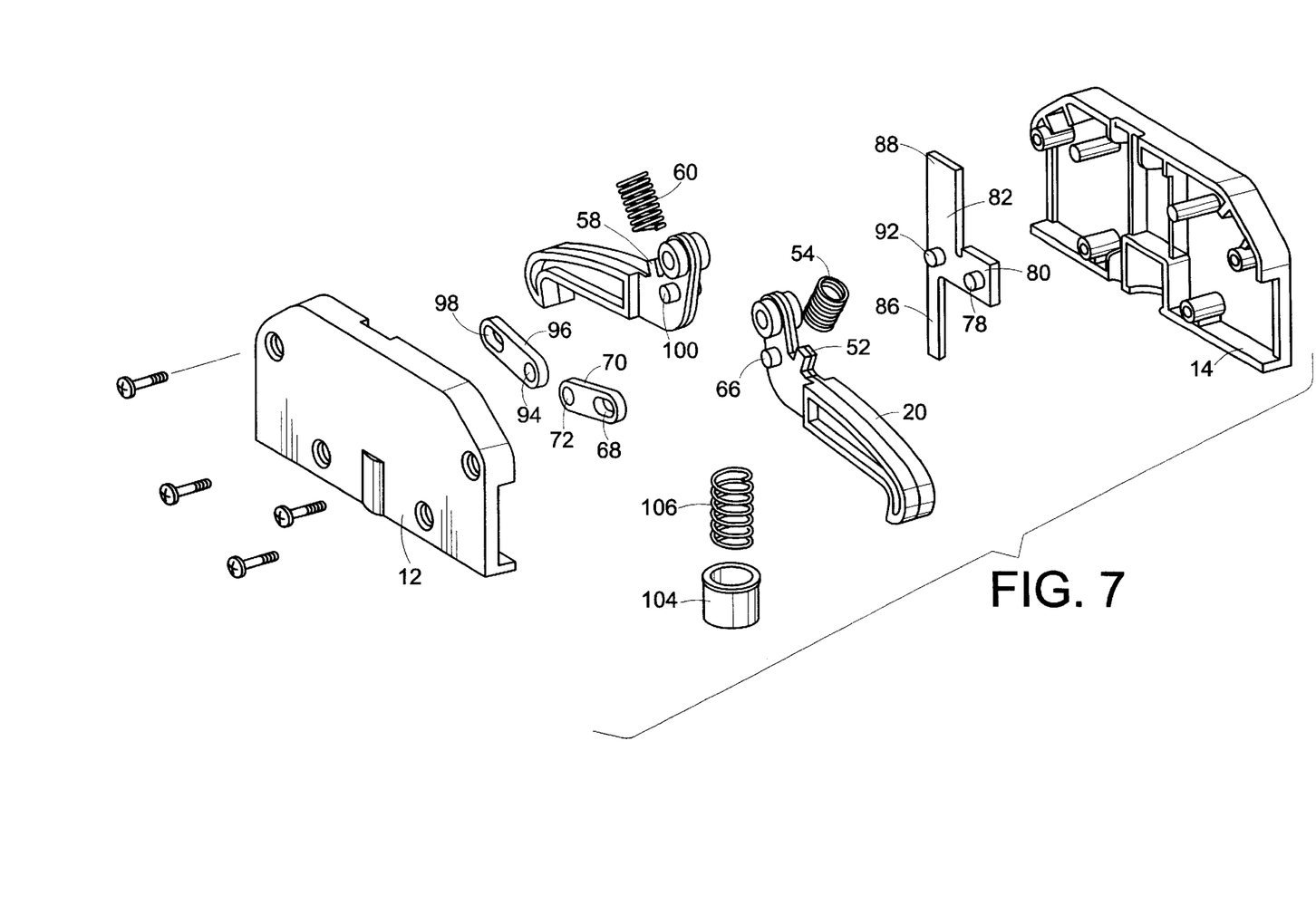
FIG. 7 is an exploded perspective view of the tool of FIG. 1.

With reference now also to FIG. 7, protruding from the first arm 20 intermediate the proximal and distal ends thereof is a first stem 52. Mounted on the first stem is one end of a first spring 54. The other end of the spring is housed in a spring chamber 56 defined between the housing halves, as best illustrated in FIG. 4. Protruding intermediate the distal and proximal ends of the second arm 22 is a second stem 58. Mounted on the second stem is one end of a second spring 60. The other end of the second spring is held in a second spring chamber 62 defined in the housing 10 as best illustrated in FIG. 4.

Figure 5:
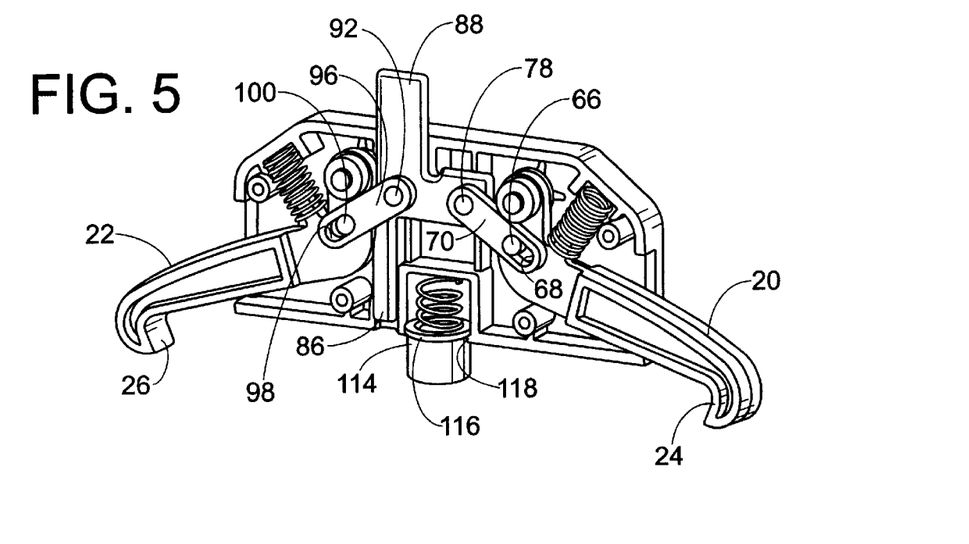
FIG. 5 is a perspective view of the tool of FIG. 3 in a second orientation of the arms.

With continued reference to FIG. 7, extending approximately normal to a plane of the first arm 20 and intermediate the distal and proximal ends thereof is a first link pin 66. As shown in FIG. 5, the first link pin 66 extends into an elongated slot 68 of a first link 70. The slot 68 is located adjacent one end of the first link 70. Located adjacent another end thereof is an aperture 72. A first pin 78, positioned on a side arm 80 of an actuator 82, protrudes into the aperture 72. The actuator is housed in an actuator chamber 84 (FIG. 4) defined between the housing halves 12 and 14. The actuator also includes a sensing arm or finger 86 positioned on one end thereof and a release stem 88 positioned on another end thereof.

Located between the sensing arm 86 and the release stem 88 and spaced from the first pin 78 is a second pin 92. It is evident from FIG. 7 that the pins 78 and 92 are oriented normal to a plane of the actuator so that they protrude out of that plane. The second pin 92 can extend into an aperture 94 of a second link member 96. The aperture 94 is located adjacent one end of the second link 96. Located adjacent the second link's opposite end is an elongated slot 98. Extending into the slot is a second link pin 100. The second link pin is located on the second arm 22 between its distal and proximal ends. The elongated slots 68 and 98 allow the links 70 and 96 to move laterally in relation to the arms 20 and 22.

Figure 6:
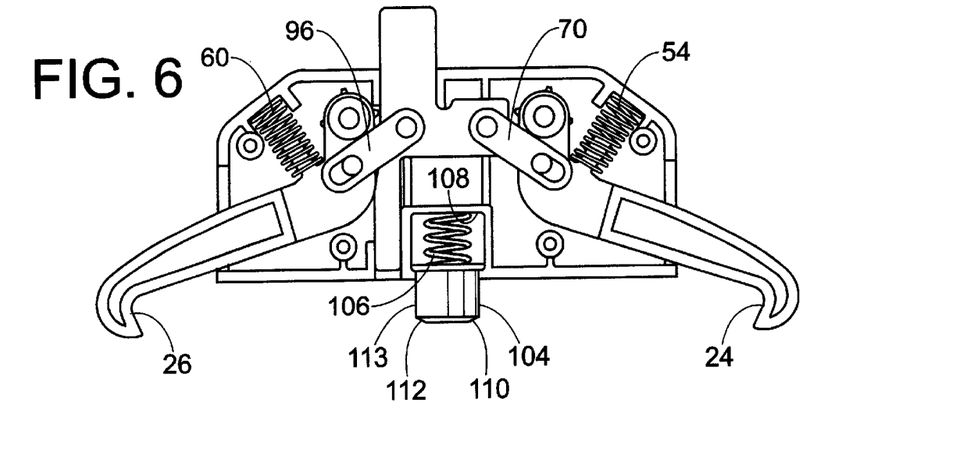
FIG. 6 is a front elevational view of the tool of FIG. 5.

A centering plug 104 protrudes from the housing 10. With reference now to FIG. 6, the centering plug is biased outwardly in the housing by a spring 106 which is mounted in a spring chamber 108. As best illustrated in FIG. 4, the spring chamber 108 is defined between the first and second housing halves 12 and 14. The centering plug has a distal end 110 encircled by a tapered surface 112 and a stem 113 leading to a proximal end 114 extending from which is a skirt 116 (FIG. 5). With reference now to FIG. 5, the skirt 116 abuts against a shoulder 118 located at an outer end of the chamber 108 in order to prevent the plug from falling out of the chamber. Note that the spring 106 resiliently biases the plug outwardly in the chamber 108 as is illustrated in FIG. 5.

With reference now to FIG. 8, it is well-known that a disc case C has a base 120 with a centrally located aperture 122 into which extend several spring fingers 124. A recess 126, defined in the base 120 of the case C, houses the disc B. When the tool A is brought into contact with the disc B, several things happen simultaneously. The distal end 110 of the centering plug 104 is configured to enter within an opening defined between the spring fingers 124 of the disc case. As the distal end 110 of the plug 104 enters the opening between the spring fingers, the arms 20 and 22 rest on a top surface of the disc B. In this position, the tapered surface 112 of the centering plug depresses the spring fingers 124. Due to their construction, the spring fingers are pivoted inwardly so that they unlock from the central hole in the disc, thereby releasing the disc B from the case C.

At the same time, the sensing arm 86 engages against a wall of the disc. The purpose of the sensing arm is to determine whether a disc is present. No movement of the actuator will occur if the arm 86 doesn't move. Continued movement of the tool A downwardly will cause the sensing arm 86 to move upwardly in the housing 10 thereby moving the actuator 82 as well. Movement of the actuator 82 upwardly in the housing 10 causes the links 70 and 96 to pivot on their pins 42 and 46 and move from the extended arms condition shown in FIG. 3 to the contracted arms condition shown in FIG. 6. More specifically, the arms 20 and 22 move against the resilient bias of their respective springs 54 and 60 as the links operate upon the pins 66 and 100 of their respective arms.

In other words, the links are moved from their orientation illustrated in FIG. 4, constituting an open position of the arms, to the orientation illustrated in FIG. 5, which constitutes a closed position of the arms. At this point, the sensing arm 86 is retracted into the housing 10 and the release stem 88 now fully extends out of the housing. With the arms being in their closed positions, they will grip opposed portions of the edge of the disc B as illustrated in FIG. 8.

As mentioned, the centering plug 104 engages on the spring fingers 124 and presses them down. The disc B is now released and can be grasped by the arms 20 and 22 of the tool so that if the tool is raised in this condition away from the case C, the disc will come with it.

In order to avoid inadvertently dropping the disc by an unwanted release by the arms, the arms 20 and 22 are prevented from pivoting on the pins 42 and 46 by the links 70 and 96 which lock the arms in place due, in part, to the action of the springs 54 and 60 until the release stem 88 is depressed.

However, as the release stem 88 is pushed in, the links 70 and 96 will be rotated as the pins 78 and 92 move downwardly with the actuator 82. This will cause a rotation of the arms 20 and 22 so as to move their distal ends 24 and 26 radially away from each other. Such movement spaces the arms from the opposed portions of the edge of the disc so that the disc C is released. During release, the centering plug 104 can be engaged against any spring fingers such as those located in a disc case to depress them and permit placing the disc back in the disc case. Removing the tool A allows the spring fingers of the case to grip the wall surface around the central aperture in the disc. Thus, a disc handling cycle is completed with safe movement of the disc without manual handling thereof.

Figure 9:
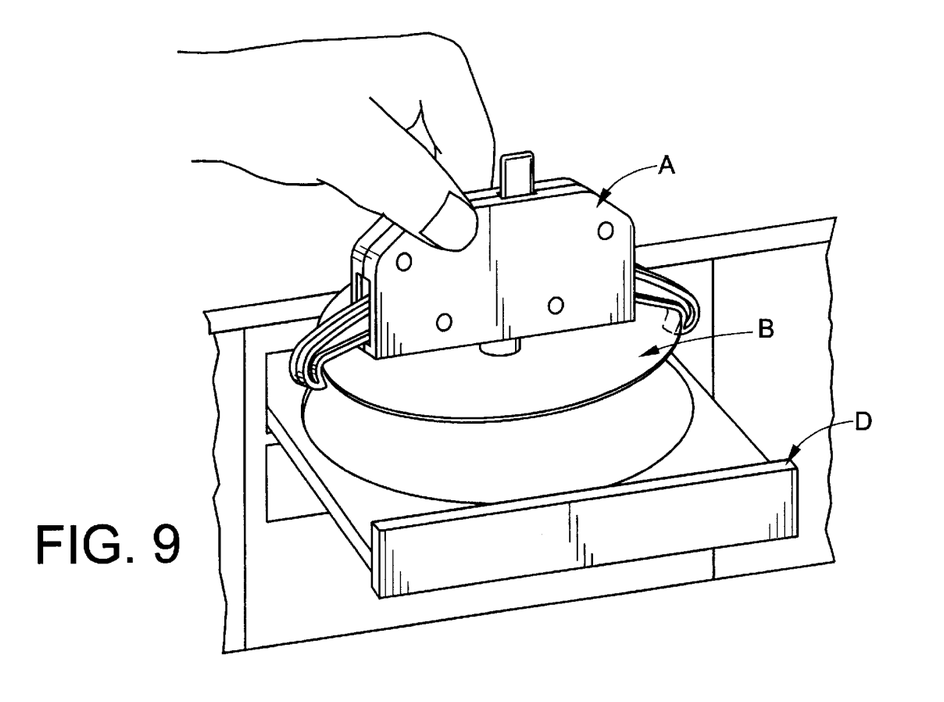
FIG. 9 is a perspective view of a disc being placed in a drive of a disc player.

It is evident that the disc can thus be moved from a disc case C, as illustrated in FIG. 8, to a disc player D, as illustrated in FIG. 9, and vice versa.

Figure 10:
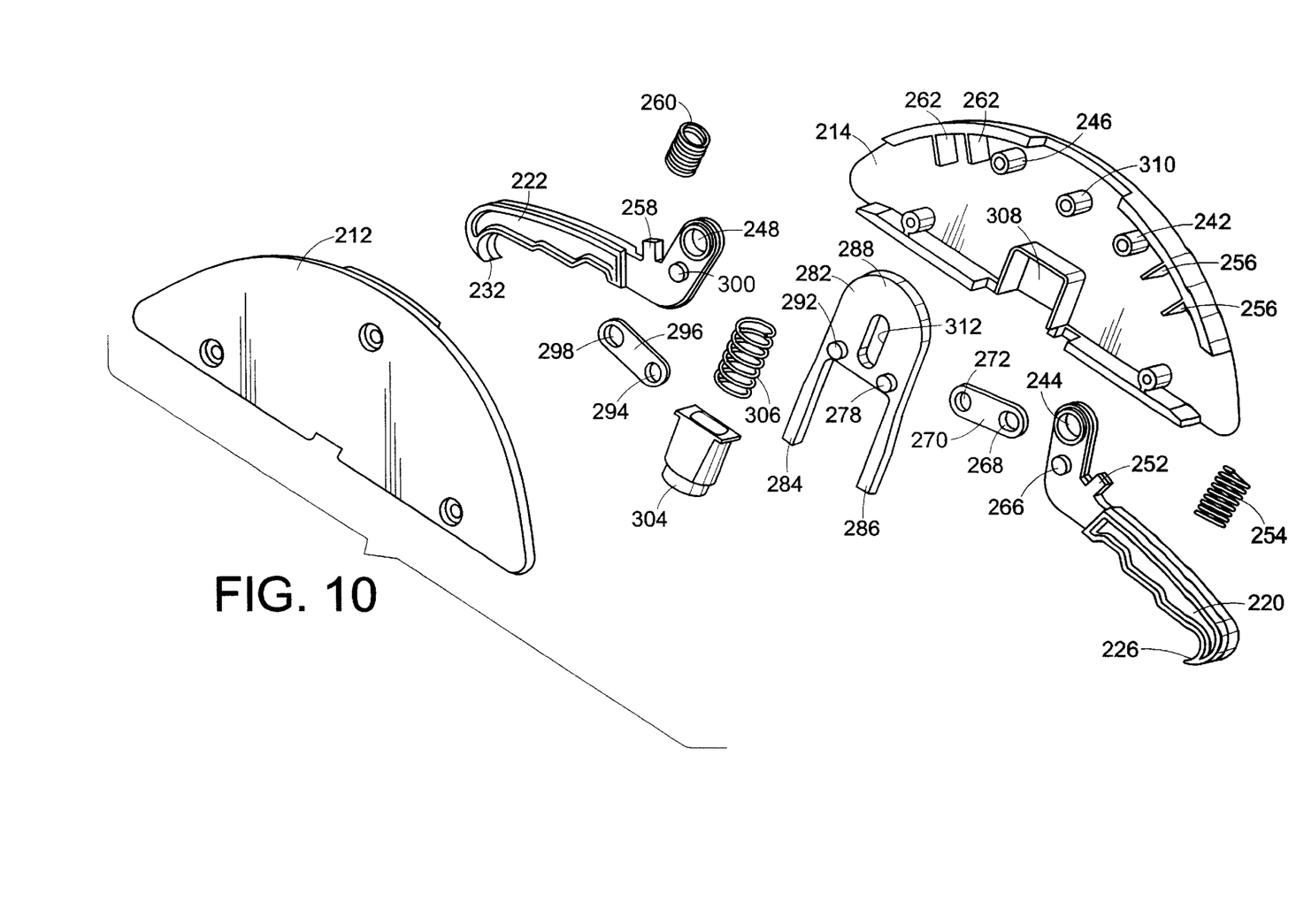
FIG. 10 is an exploded perspective view of a disc handling tool according to a second preferred embodiment of the present invention; and, FIG. 11 is a side elevational view of the tool of FIG. 10 in an assembled condition and partially broken away.
Figure 11:
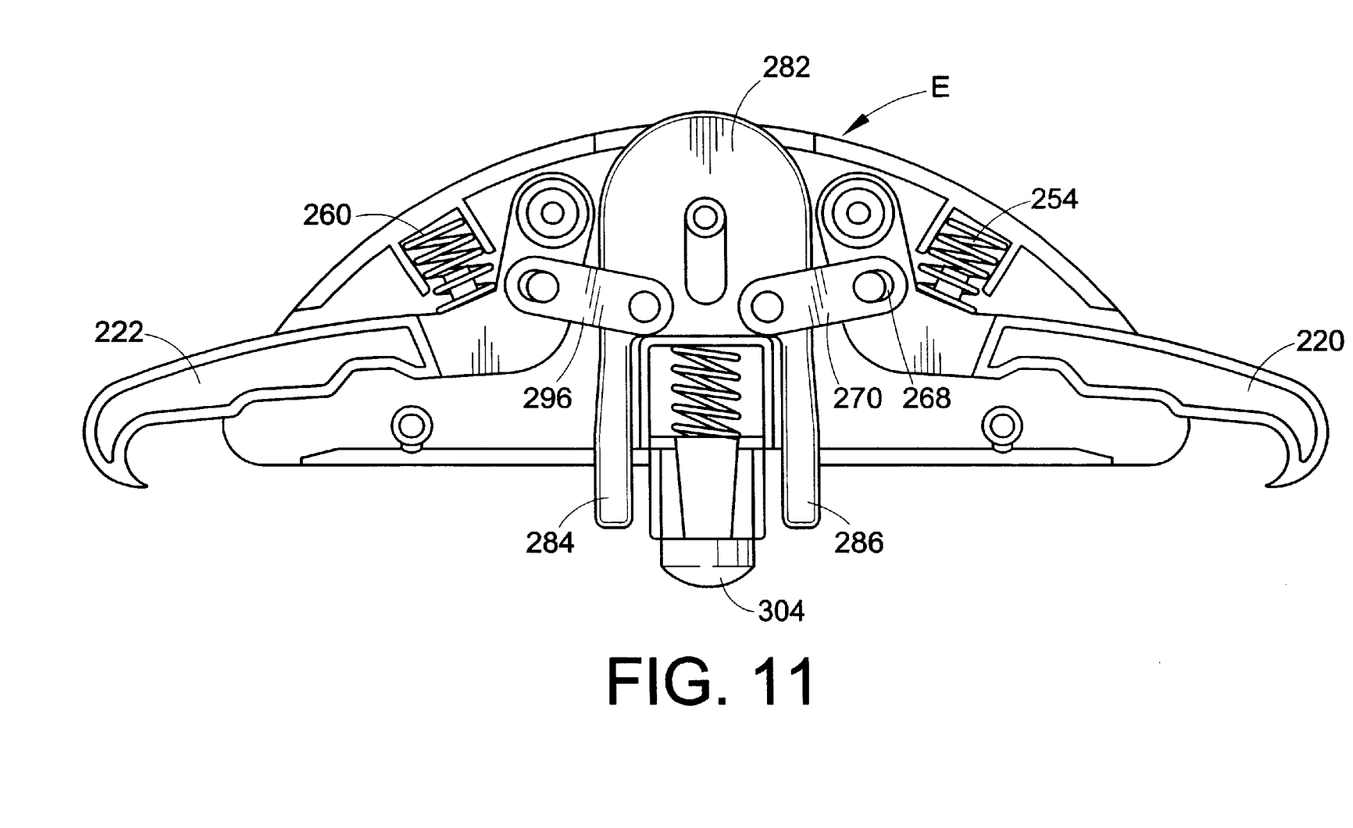

With reference now to FIG. 11, a disc tool E according to another preferred embodiment of the present invention also is provided with a pair of moveable arms. With reference now particularly to FIG. 10, the tool includes a first housing half 212 and a second housing half 214. Suitable fasteners (not illustrated) secure the two halves together. Mounted in a chamber defined between the two halves is a first arm 220 and a second arm 222. Positioned at a distal end of the first arm 220 is a first gripping finger 226. Positioned at a distal end of the second arm 222 is a second gripping finger 232.

Located in the cavity defined between the two halves 212 and 214 is a first pivot pin 242 on which a proximal end 244 of the first arm 220 is rotatably mounted. Spaced from the first pivot pin 242 is a second pivot pin 246 on which a proximal end 248 of the second arm 222 is rotatably mounted. Protruding from the first arm 220 intermediate the ends thereof is a first stem 252. Mounted on the first stem is one end of a spring 254. The other end of the spring is housed in a spring chamber defined between the housing halves. Lateral movement of the spring 254 is prevented by cooperating wall sections 256. Protruding intermediate the ends of the second arm 222 is a second stem 258. Mounted on the second stem is one end of a second spring 260. The other end of the second spring is held in a second spring chamber defined between the housing halves. Lateral movement of the second spring is limited by cooperating side walls 262.

Extending approximately normal to a plane of the first arm 220 and intermediate the distal and proximal ends thereof is a first link pin 266. As shown in FIG. 11, the first link pin 266 extends into an elongated slot 268 of a first link 270. The slot 268 is located adjacent one end of the first link 270. Located adjacent another end thereof is an aperture 272. A first pin 278 is positioned on an actuator 282 and protrudes into the aperture 272 as best shown in FIG. 11. The actuator is housed between the cooperating housing halves 212 and 214. The actuator also includes a pair of spaced sensing arms 284 and 286 positioned on one end thereof.

Positioned on another end of the actuator 282 is a manual contact surface 288. Located on the actuator 282 and spaced from the first pin 278 is a second pin 292. The second pin extends into an aperture 294 of a second link member 296. The aperture 294 is located adjacent one end of the second link 296. Located adjacent the opposite end thereof is an elongated slot 298. Extending into the slot is a second link pin 300. The second link pin is located on the second arm 222 between its distal and proximal ends. The elongated slots 268 and 298 allow the links 270 and 296 to move laterally in relation to the arms 220 and 222.

A centering plug 304 protrudes from the housing. The centering plug is biased outwardly via a spring 306 which is mounted in a spring chamber 308. The spring 306 resiliently biases the plug 304 outwardly in the chamber 308 as is illustrated in FIG. 11. It should be apparent from FIG. 11 that suitable apertures are defined in the housing to allow the actuator 282 and the two arms 220 and 222 to protrude outwardly from the housing. Similarly, the plug 304 and the sensing arms 284 and 286 protrude outwardly from the housing.

The operation of this embodiment of the invention is substantially identical to the operation of the first embodiment mentioned above. However, in this embodiment, the two sensing arms or fingers 284, 286 are provided one on each side of a rotational axis of the associated disc. As the plug 304 enters the central opening of a disc, the sensing arms 284 and 286 engage against a wall of the disc. Continued movement of the tool E downwardly will cause the sensing arms to move upwardly in the housing thereby moving the actuator 282 as well. Movement of the actuator upwardly in the housing causes the links 270 and 296 to pivot on their pivot pins 242 and 246 and move the arms 220 and 222 from the extended arms condition shown in FIG. 11 to a contracted arms condition. The arms will move against the resilient bias of their respective springs 254 and 260 as the links operate upon the pins 266 and 300 on their respective arms.

Lateral movement of the actuator 282 is prevented by a centering stub 310 provided on one of the housing halves. The stub engages in an elongated slot 312 defined in the body of the actuator 282. This construction enables the actuator 282 to reciprocate up and down in relation to the housing.

Thus, the present invention pertains to a device for handling a disc having a central aperture. The device comprises a housing extending from which are a pair of opposed arms having distal ends with gripping fingers that selectively engage opposed edge portions of a disc. The device also has a centering plug and, spaced therefrom, at least one sensing leg. The at least one sensing leg is located on an actuator which selectively moves the arms from a first condition in which the gripping fingers are spaced further apart than a diameter of the disc to a second condition in which the gripping fingers are positioned apart by a distance less than the diameter of the disc so as to engage the disc. The arms are simply held by friction in the open position. As mentioned, the actuator has at least one sensing leg for moving the arms to a closed end position. Links and springs lock the arms in the closed end position until the actuator is depressed.

A new and improved disc handling device is thus provided which has a resiliently biased operator that selectively allows the tool to pick up a disc. The disc can thus be removed from its jewel case, transported to a player and back again without being smudged or scratched by the fingers of a person. It has been found that discs are surprisingly vulnerable to fingerprints, not to mention scratching, and various stains from drinks, food products and the like.

The manufacturers of discs always instruct purchasers that the discs should only be held by the edges and should always be stored in their cases.

It should be evident from the several views provided herein, that the disc handling tool is preferably thin. In this way, the tool can be packaged in a standard jewel box and sold along with the discs themselves. In addition, the disc handling tool preferably has the same diameter as the disc it is meant to handle in order to allow the tool to be packaged with the discs themselves. The disc handling tool according to the present invention lessens the possibility that the disc will be dropped thereby damaging or breaking the disc. The disc handling tool is advantageous due to its ease of use and it is particularly of benefit to people who have limited dexterity.

The invention has been described with reference to several preferred embodiments. Obviously, modifications and alterations will occur to others upon a reading and understanding of this specification. It is intended to include all such modifications and alterations insofar as they come within the scope of the appended claims or the equivalents thereof.

Having thus described the preferred embodiments, the invention is claimed as follows:

1. A disc handling tool comprising:
   a housing;
   a first arm pivotally mounted to said housing;
   a second arm pivotally mounted to said housing in spaced relation to said first arm;
   a first gripper located adjacent a distal end of said first arm for fitting about a peripheral edge of an associated disc;
   a second gripper located adjacent a distal end of said second arm for fitting about the peripheral edge of the associated disc, said first and second grippers being tangential to the peripheral edge of the associated disc;
   a locking member for locking at least one of said first and second arms in one end position in relation to said housing; and,
   an actuator for moving said first and second arms in relation to said housing, wherein said actuator comprises a pair of spaced sensors for contacting a portion of the associated disc.

2. The tool of claim 1 further comprising:
   a first biasing member for urging said first arm in one direction in relation to said housing; and
   a second biasing member for urging said second arm in one direction in relation to said housing.

3. The tool of claim 1 wherein said tool further comprises a centering plug and a biasing element for biasing said centering plug towards one end position.

4. The tool of claim 1 wherein said housing comprises:
   a first housing half;
   a second housing half;
   an interior chamber formed by a cooperation of said first and second housing halves for accommodating said first and second arms; and,
   at least one fastener for securing said first and second housing halves together.

5. A tool for handling discs, such as CDS, DVDs and the like, the tool comprising:
   a housing;
   a first arm pivotally mounted in said housing;
   a second arm pivotally mounted in said housing in spaced relation to said first arm;
   a first finger located adjacent a distal end of said first arm for fitting about a peripheral edge of an associated disc;
   a second finger located adjacent a distal end of said second arm for fitting about the peripheral edge of the associated disc, said first and second fingers being tangential to the peripheral edge of the associated disc; and,
   a linkage assembly for moving said first and second arms from one end position, in which a distance between the fingers is greater than a diameter of the associated disc, and another end position, in which the distance between the fingers is less than the diameter of the associated disc, wherein said linkage assembly comprises:
      a first link mounted within said housing and connected to said first arm, adjacent a first end of said first link; and,
      a second link mounted within said housing and connected to said second arm, adjacent a first end of said second link.

6. The tool of claim 5 further comprising an actuator for moving said first and second arms, via said linkage assembly, in relation to said housing.

7. The tool of claim 6 wherein said first link is connected to said actuator, adjacent a second end of said first link and wherein said second link is connected to said actuator, adjacent a second end of said second link.

8. The tool of claim 6 wherein said actuator comprises a sensor for contacting a portion of the associated disc.

9. The tool of claim 8 wherein said actuator comprises a pair of spaced sensors.

10. The tool of claim 6 wherein said actuator further comprises a manual contact surface.

11. The tool of claim 5 further comprising:
    a first biasing member for urging said first arm in one direction in relation to said housing; and
    a second biasing member for urging said second arm in one direction in relation to said housing.

12. The tool of claim 5 further comprising:
    a centering plug mounted in said housing; and,
    a biasing element for biasing said centering plug into one end position in relation to said housing.

13. A tool for handling discs, such as CDs, DVDs and the like, the tool comprising:
    a housing;
    a first arm pivotally mounted in said housing;
    a second arm pivotally mounted in said housing in spaced relation to said first arm;
    a first gripper located at a distal end of said first arm for fitting about a peripheral edge of an associated disc;
    a second gripper located at a distal end of said second arm for fitting about the peripheral edge of the associated disc, said first and second grippers being tangential to the peripheral edge of the associated disc;
    a first link member having a first end and a second end, said first link member being positioned in said housing;
    a second link member having a first end and a second end, said second link member being positioned in said housing in spaced relation to said first link member;
    an actuator for moving said first and second arms in relation to said housing; and,
       wherein said first link member is connected, adjacent said first end, to said first arm and, adjacent said second end, to said actuator, and wherein said second link member is connected, adjacent said first end, to said second arm and, adjacent said second end, to said actuator.

14. The tool of claim 13 wherein said actuator comprises a sensor for contacting a portion of the associated disc.

15. The tool of claim 14 wherein said actuator sensor comprises a pair of spaced sensor arms.

16. The tool of claim 13 further comprising:
   a first biasing member for urging said first arm in one direction in relation to said housing; and
   a second biasing member for urging said second arm in one direction in relation to said housing.

17. The tool of claim 13 further comprising a centering plug mounted in said housing.

18. The tool of claim 17 further comprising a biasing element for biasing said centering plug into one end position in relation to said housing.

19. A disc handling tool comprising:
   a housing;
   first and second arms pivotally mounted to said housing;
   a first contact portion located adjacent a first end of said first arm;
   a second contact portion located adjacent a first end of said second arm; and,
   a linkage assembly for moving said first and second arms from a first position, in which a distance between said first and second contact portions is greater than a diameter of an associated disc, and a second position, in which the distance between said first and second contact portions is less than the diameter of the associated disc, said linkage assembly comprising:
      a first link mounted to said housing and connected to said first arm, and
      a second link mounted to said housing and connected to said second arm.

20. The tool of claim 19 further comprising an actuator for moving said first and second links in relation to said housing.

21. The tool of claim 19 further comprising a centering plug and a biasing element for biasing said centering plug towards one end position.

22. The tool of claim 19 further comprising at least one sensor for contacting a portion of the associated disk.

* * * * *